(12) United States Patent
Fabian et al.

(10) Patent No.: US 8,945,239 B2
(45) Date of Patent: Feb. 3, 2015

(54) INORGANIC OPTICAL BRIGHTENER

(75) Inventors: Christian Fabian, Waghäusel (DE); Bernhard Seider, Malsburg-Marzell (DE); Hans Reichert, Rheinfelden (DE)

(73) Assignee: Ciba Corp., Tarrytown, NY (US)

( * ) Notice: Subject to any disclaimer, the term of this patent is extended or adjusted under 35 U.S.C. 154(b) by 0 days.

(21) Appl. No.: 12/226,296

(22) PCT Filed: Apr. 10, 2007

(86) PCT No.: PCT/EP2007/053439
§ 371 (c)(1),
(2), (4) Date: Oct. 14, 2008

(87) PCT Pub. No.: WO2007/118813
PCT Pub. Date: Oct. 25, 2007

(65) Prior Publication Data
US 2009/0137445 A1 May 28, 2009

(30) Foreign Application Priority Data

Apr. 19, 2006 (EP) .................................... 06112757

(51) Int. Cl.
| | | |
|---|---|---|
| D06L 3/12 | (2006.01) | |
| C11D 3/42 | (2006.01) | |
| C09K 11/77 | (2006.01) | |
| D21H 21/30 | (2006.01) | |
| C08K 3/32 | (2006.01) | |

(52) U.S. Cl.
CPC .............. *C11D 3/42* (2013.01); *C09K 11/7734* (2013.01); *C09K 11/7738* (2013.01); *D21H 21/30* (2013.01); *C08K 3/32* (2013.01); *Y10S 8/919* (2013.01)
USPC .............. 8/648; 8/101; 8/107; 8/116.1; 8/919

(58) Field of Classification Search
USPC ............ 313/485, 486; 252/301.4; 8/648, 101, 8/107, 116.1, 919
See application file for complete search history.

(56) References Cited

U.S. PATENT DOCUMENTS

| | | | | |
|---|---|---|---|---|
| 4,451,521 | A * | 5/1984 | Kaule et al. .................... | 428/199 |
| 4,618,778 | A * | 10/1986 | Kitada ........................ | 250/483.1 |
| 5,308,824 | A * | 5/1994 | Matsushita et al. ........... | 503/226 |
| 5,424,006 | A | 6/1995 | Murayama et al. | |
| 5,686,022 | A | 11/1997 | Murayama et al. | |
| 5,859,496 | A | 1/1999 | Murazaki et al. ............ | 313/485 |
| 6,375,864 | B1 | 4/2002 | Phillips et al. | |
| 6,692,660 | B2 * | 2/2004 | Kumar .................... | 252/301.4 R |
| 6,726,992 | B1 * | 4/2004 | Yadav et al. .................. | 428/403 |
| 6,940,216 | B2 * | 9/2005 | Juestel et al. ................. | 313/486 |
| 7,094,289 | B2 | 8/2006 | Akimoto et al. | |
| 7,099,241 | B1 | 8/2006 | Buchler et al. | |
| 7,229,600 | B2 * | 6/2007 | Yadav ........................ | 423/263 |
| 7,372,196 | B2 * | 5/2008 | Juestel et al. ................. | 313/486 |
| 2003/0067008 | A1 | 4/2003 | Srivastava et al. .............. | 257/79 |
| 2003/0143426 | A1 * | 7/2003 | Haneda et al. ................. | 428/690 |
| 2004/0028592 | A1 | 2/2004 | Akimoto et al. .............. | 423/263 |
| 2004/0072106 | A1 | 4/2004 | Chua et al. ..................... | 430/320 |
| 2004/0095058 | A1 | 5/2004 | Dutta ............................ | 313/485 |
| 2004/0145307 | A1 | 7/2004 | Odaki ........................... | 313/512 |
| 2005/0156496 | A1 * | 7/2005 | Takashima et al. ........... | 313/237 |
| 2006/0001352 | A1 | 1/2006 | Maruta et al. | |
| 2006/0180792 | A1 * | 8/2006 | Ricci et al. ............... | 252/301.16 |

FOREIGN PATENT DOCUMENTS

| | | |
|---|---|---|
| CN | 1483663 A | 3/2004 |
| CN | 1148729 C | 5/2004 |
| EP | 1 391 423 | 2/2004 |
| EP | 1 560 274 | 8/2005 |
| JP | 09-049195 | 2/1997 |
| JP | 11016503 * | 1/1999 |
| JP | 11-061115 | 3/1999 |
| JP | 2003-519282 | 6/2003 |
| JP | 2006-051686 | 2/2006 |
| JP | 2006-143894 | 6/2006 |
| JP | 2006-186182 * | 7/2006 |
| WO | 01/49934 | 7/2001 |
| WO | 2006/016581 | 2/2006 |

OTHER PUBLICATIONS

Sandoz Derwent abstract 1971-11916S (1973).*
Allison et al. "Remote thermometry with thermographic phosphors: instrumentation and applications" Rev. Sci. Instrum. 68 (7) Jul. 1997.*
Teng Yujie et al., Journal of Rare Earths, vol. 10, No. 4, pp. 331-334 (Dec. 31, 1992) See details in Letter received from Chinese Agent regarding Office action details. Ref. was not available.
Letter from Chinese Agent dated Aug. 17, 2011.
English language machine-generated translation for JP2006-143894 (12 pages); 2006.
English language machine-generated translation for JP11-061115 (9 pages); 1999.
English language machine-generated translation for JP09-049195 (6 pages); 1997.
English language machine-generated translation for JP2006-051686 (12 pages); 2006.
Bacalski et al., "The Effects of Fuel-to-Oxidizer Ratio on Luminescence Properties and Particle Morphology of Combustion-Synthesized Europium-Activated Barium Magnesium Aluminate," Journal of the SID Supplement-1, 2000, pp. 93-98.

* cited by examiner

*Primary Examiner* — Amina Khan
(74) *Attorney, Agent, or Firm* — Shruti Costales

(57) ABSTRACT

The invention relates to novel inorganic brighteners, a process for their preparation and their use for brightening substrates. More specifically, the novel inorganic brighteners are phosphors characterized in that they have (i) an absorption maximum in the range of from 350 to 375 nm; (ii) a steep decrease of the absorption band near 400 nm; (iii) a quantum yield of the phosphorescence of at least 0.8; and (iv) a phosphorescence maximum in the range between 415 and 445 nm.

4 Claims, No Drawings

INORGANIC OPTICAL BRIGHTENER

The invention relates to novel inorganic brighteners, a process for their preparation and their use for brightening substrates.

Generally, optical brighteners are colorless to weakly colored organic compounds that, in solution or applied to a substrate, absorb ultraviolet light (e.g., from daylight at ca. 300-430 nm) and reemit most of the absorbed energy as blue fluorescent light between ca. 400 and 500 nm. In daylight optical brighteners can thus compensate for the aesthetically undesirable yellowish cast found in white industrial substrates, such as textiles, papers, or plastics. Furthermore, since a portion of the daylight spectrum not perceived by the eye is converted to visible light, the brightness of the material is enhanced to give a dazzling white.

One method of compensating for the yellowish cast is the use of a blue dye such as ultramarine or indigo. Bluing lowers the reflectance of the sample in the long-wavelength part of the visible spectrum. As a result, the sample takes on a neutral white appearance, but at the same time it loses brightness so that it looks grayer. In contrast, optical brighteners lower the reflectance mainly in the UV and near-visible by absorption; at visible wavelengths (mostly with a maximum at 435-440 nm), they greatly increase the reflectance through fluorescence. The brightener acts as a supplementary emission source.

Typical optical brighteners are characterized by π-electron chromophores in which π-π* transitions occur. The chromophores must be rigid and their conformations should differ only slightly in the electronic ground state and in the first excited state. Best known optical brighteners include carbocycles such as distyrylbenzenes, distyrylbiphenyls, divinylstilbenes; triazinylaminostilbenes; stilbenyl-2H-triazoles such as stilbenyl-2H-naphtho[1,2-d]triazoles and bis(1,2,3-triazol-2-yl)stilbenes; benzoxazoles such as stilbenylbenzoxazoles and bis(benzoxazoles); furans, benzo[b]furans, and benzimidazoles such as bis(benzo[b]furan-2-yl)biphenyls and cationic benzimidazoles; 1,3-diphenyl-2-pyrazolines; coumarins; naphthalimides; and 1,3,5-triazin-2-yl derivatives.

Commercial optical brighteners are formulated specifically according to structure, substrate, and mode of application. Nondusting, easily meterable forms are preferred: free-flowing granules with high crushing strength, solutions, or concentrated dispersions. Nonionogenic optical brighteners must be as finely divided as possible so that they can be quickly and optimally distributed in apolar substrates. They are generally marketed as powders (e.g., for plastics or spinning masses) or as low-viscosity dispersions (e.g., for the textile industry). Formulations are optimized with additives to control granule strength, dissolution, chemical stability, viscosity, stability on storage, or fungal growth. They can also contain toning dyes and auxiliaries to improve their efficiency in a given application.

Several thousand optical brightener products with more than 100 trade names are on the market worldwide such as Blankophor™ (Bayer), Hakkol™ (Showa Kayaku), Hostalux™ (Clariant), Kayaphor™ (Nippon Kayaku), Leukophor™ (Clariant), Optiblanc™ (3V), Photine™ (Hickson & Welch), Tinopal™ (Ciba Specialty Chemicals), Ultraphor™ (BASF), Uvitex™ (Ciba Specialty Chemicals), Whitex™ (Sumitomo), Belofor™, Calcofluor White™, Eastobright™, Enkantine™, Heliophor™, Mikephor™, Ranipal™, Rylux™, Viophos™, and Wobital™.

In all the cases mentioned above, however, absorption of as much UV light as possible in combination with as less inherent color as possible, intenseness of fluorescence to produce a maximum of whiteness and dispersibility of the brightener in the substrate are still unable to meet satisfactorily all of the ever growing demands. In addition, there is a steady demand for new chemical classes of optical brighteners to better meet the specific requirements put on optical brighteners in different applications.

According to this invention it has now been found, surprisingly, that it is possible to more satisfactorily meet the above-mentioned demands when selected inorganic phosphors are used as optical brighteners.

The invention therefore relates to an inorganic phosphor for use as an optical brightener wherein said phosphor is characterized by:

(i) an absorption maximum in the range of from 350 to 375 nm;
(ii) a steep decrease of the absorption band near 400 nm;
(iii) a quantum yield of the phosphorescence of at least 0.8, preferably 0.95; and
(iv) a phosphorescence maximum in the range between 415 and 445 nm.

The term "inorganic phosphor" relates to synthetically produced crystalline compounds that absorb energy acting on them and subsequently emit this absorbed energy as light, either immediately or over a longer period, in excess of thermal radiation. This light emission, for which, in contrast to thermal radiation, the exciting energy first does not contribute to the thermal energy of the compound, is known as luminescence. It arises from excited states in atoms or molecules which have a lifetime of at least $10^{-9}$ s. This means that between excitation and light emission there is a time span of $10^{-9}$ s. Light emission occurring during excitation and up to ca. $10^{-8}$ s afterwards is called fluorescence, while the glow continuing longer than $10^{-8}$ S is known as afterglow or phosphorescence. The decay time is the time in which the brightness decreases to $\frac{1}{10}$ or 1/e of the initial intensity, for hyperbolic and exponential decay, respectively.

Suitable inorganic phosphors include but are not limited to sulfides and selenides such as cadmium sulfides and sulfoselenides, alkaline-earth sulfides and sulfoselenides; oxysulfides; oxygen-dominant phosphors such as aluminates, gallates, silicates, germanates, halophosphates and phosphates, oxides, arsenates, vanadates, niobates and tantalates, sulfates, tungstates and molybdates; halide phosphors such as metal halide and manganese-activated halide phosphors.

Further, the inventive inorganic phosphor preferably has a particle size distribution of from 0.01 to 20 μm. The measurement of particle-size distribution can be carried out with particle counting instruments (Coulter counter) or by laser or light-beam scattering (Cilas). The Fisher number is widely used as a measure of the average particle diameter (Fisher sub sieve size). Nanoparticles with at least one dimension below 100 nm are especially preferred.

The shape of the inventive inorganic phosphor particles is preferably spherically, however particles having a cubic or lamellar shape are likewise suitable. The form of the phosphor crystals can be assessed by scanning electron microscopy.

For relatively coarse phosphors, such as D50>5 μm, the particle-size distribution was determined from sieve residue curves.

Also, the inventive inorganic phosphors are characterized by a sedimentation rate, sedimentation density or other sedimentation characteristics. The sedimentation rate in the sedimentation fluid can be determined according to Stokes' law by the size, shape, density, and surface charge of the particles. The sedimentation characteristics of phosphors and their blends is an important criterion for their suitability, apart from the luminescence brightness and luminescence color. The sedimentation density allows conclusions to be made on the degree of agglomeration of individual crystals at constant polarity and electrolyte concentration of the sedimentation fluid. A low density is an indication of extensive agglomerate formation. The inventive inorganic phosphors provide for monomolecular brightener distribution, even at high concentrations. Due to the lack of aggregation of the brightener molecules, the quantum yields are not lowered and the spectra are essentially unchanged.

Preferred optical brighteners are those which conform to the formula (I)

$$A_xB_y:Eu \quad (I)$$

wherein

A is at least one alkaline earth metal and/or zinc;

B is at least one anion selected from the group consisting of aluminosilicate, alumina oxide, silicium oxide, phosphate, and halogen;

x is an integer of 1-10, y is an integer of 1-5 and x and y are such that the electrical charge is balanced; and wherein the content of europium is from 0.01 to 1 mole percent.

Particularly preferred brighteners conform to the formula (I)

wherein

A is at least one alkaline earth metal selected from the group consisting of barium, magnesium, calcium and/or strontium;

B is at least one anion selected from the group consisting of $Al_{10}O_{17}^{4-}$, $Al_{16}O_{27}^{6-}$, $PO_4^{3-}$, and halogen; and wherein the content of europium is from 0.1 to 0.5 mole percent.

Preferred brighteners of the formula (I) are $BaMgAl_{10}O_{17}$:Eu, $BaMg_2Al_{16}O_{27}$:Eu, and $Sr_3Ca_2(PO_4)_3Cl$:Eu or $(SrBaCa)_5(PO_4)_3Cl$:Eu.

The invention further provides a process for preparing the brighteners of formula (I), which is characterized in that the reaction is effected at a temperature of 1100 to 1600° C., preferably in the presence of $N_2$ and/or $H_2$, such as 90% $N_2$ and 10% $H_2$, or alternatively 95% $N_2$ and 5% $H_2$.

The invention also provides brightener preparations containing the brightener of the formula (I) according to the invention and non-ionic or ionic tensides. Preferred are polyglycol ethers.

Non-luminescent salts may be present in addition.

The inventive inorganic phosphors can be used as optical brighteners in the textile, detergent, and paper industries and are also added to plastics. Both the mode of application and performance requirements differs greatly from one substrate to another, but there are five common basic principles:

(1) The inventive optical brighteners can only improve whiteness effectively if the substrate does not absorb too strongly in their excitation and phosphorescence range. Objects with a poor "basis white", such as unbleached textiles or poorly cleaned articles, cannot be brightened to a high degree of whiteness even with high concentrations of the inventive optical brighteners.

(2) The brighteners only act effectively if they are monomolecularly dispersed in the substrate. This does not only depend on the sedimentation characteristics of phosphor but also on the substrate type and the mode of application.

(3) Whitening effects increase with phosphor concentration up to a saturation limit. For this reason, the applied concentrations of phosphor must be kept low: ca. 0.002-0.2 wt % relative to the substrate, or roughly one tenth of the usual concentration of dyes.

The phosphors of the general formula (I) according to the invention are optical brighteners for various substrates. Particularly preferred substrates are those composed of natural cellulose such as cotton, paper and wood materials in fine dispersion or materials composed of regenerated cellulose, of wool or synthetic polyamides. The materials to be optically brightened can be present in a wide variety of processing stages such as raw material, intermediate article or finished article and in a wide variety of processing forms such as for example fibers, threads, wovens, formed-loop knits, webs and also films etc.

The compounds according to the invention can also have laundry detergent added to them. The solid and liquid laundry detergents used can contain the customary ingredients corresponding to the prior art.

The compounds of the invention can further be applied during the resin finishing of fiber materials in conjunction with synthetic resins and synthetic resin precondensates. The crosslinking of the synthetic resins can be carried out over a wide pH range, especially from pH 1 to pH 10, in a conventional manner.

The compounds according to the invention can further be used for raising the sun protection factor of textile materials. The use of diaminestilbenedisulfonic acid derivatives for raising the sun protection factor of textile materials is known and described for example in EP-A 728 749.

To raise the sun protection factor of textile materials, the textile material can be treated directly with the compounds of the invention, or else the effect is achieved as part of a normal domestic laundering process when the laundry detergent used contains the compound according to the invention.

The brighteners of the formula (I) according to the invention are suitable for brightening paper materials in papermaking, for example cellulose, chemical and mechanical pulp, and for brightening the coating compositions customarily used in the paper industry, specifically for brightening unpigmented but especially pigmented paper materials and coating compositions. Especially preferred is the use of phosphors of formula (I) according to the invention as optical brighteners in microporous inkjet media.

The brighteners of the formula (I) according to the invention are preferably contained in printing inks (solvent based, water based, energy curable (UV & EB) inks and toners) for use in lithographic, flexo, gravure, screen, intaglio, digital (inkjet/electrophotography) and pad printing processes.

The binders in known coating compositions include polymer dispersions based on copolymers of butadiene-styrene, acrylonitrile-butadiene-styrene, acrylic esters, ethylene-vinyl chloride or ethylene-vinyl acetate or based on homopolymers, such as polyvinyl chloride, polyvinylidene chloride, polyethylene, polyvinyl acetate or polyurethanes. A preferred binder consists of styrene-butyl acrylate or styrene butadiene-acrylic acid interpolymers. Further polymer lattices are described, for example, in U.S. Pat. No. 3,265,654.

The coating compositions are customarily pigmented using aluminum silicates, such as china clay and kaolin, also barium sulfate, satin white, titanium dioxide or calcium carbonate (chalk).

The coating compositions according to the invention preferably contain 5 to 70% by weight of a white pigment. The binder is preferably used in an amount such that the solids content of polymeric compound comprises 1 to 30% by weight, preferably 5 to 25% by weight, of the white pigment. The amount of the brightener according to the invention is determined in such a way that the brightener is present in amounts of 0.005 to 1% by weight, especially 0.01 to 0.55% by weight, based on white pigment.

The coating composition according to the invention can be prepared by mixing the components in any order at temperatures of 10 to 100° C., preferably 20 to 80° C. The components also include the customary auxiliaries which can be used to regulate the rheological properties, such as the viscosity or water retention capability, of the coating compositions. Such auxiliaries are for example natural binders, such as starch, casein, protein or gelatin, cellulose ethers, such as carboxyalkylcellulose or hydroxyalkylcellulose, alginic acid, alginates, polyethylene oxide or polyethylene oxide alkyl ethers, interpolymers of ethylene oxide and propylene oxide, polyvinyl alcohol, polyvinylpyrrolidone, water-soluble condensation products of formaldehyde with urea or melamine, polyphosphates or polyacrylic acid salts.

The brighteners of the formula (I) according to the invention are incorporated either into the finished coating composition or into one of the components of the coating composition.

The coating composition according to the invention can be used for coating paper, wood, films, such as for example cellulose, cellulose triacetate, textile materials, etc. Particular preference is given to the application to paper and cardboard and also photopapers.

The coating composition can be applied to the substrate by any conventional method, for example using an air knife, a coating blade, a brush, a roll, a doctor or a rod, and the coating is then dried, for example using an infrared dryer and/or hot air dryer, at substrate surface temperatures in the range from 70 to 200° C., preferably from 90 to 130° C., to a residual moisture content of 3 to 6% by weight.

The coating compositions according to the invention provide coatings notable for an optimum distribution of the optical brighteners across the entire surface and an attendant increase in the whiteness and also for a high lighftastness.

EXAMPLES

Analytical Methods

Chromatographic methods (interpretation of phosphorescing spots in thin layer chromatography or of UV absorption peaks in HPLC) allow fairly rapid and certain identification of optical brighteners. The same methods can be used for qualitative and quantitative characterization of the optical brightener's purity in terms of phosphorescent or non-phosphorescent byproducts. The content of active substance is determined by photometric measurement of the extinction (absorbance) in solution ($E_I^1$). Both the wavelength and the height of the absorption maximum depend on the solvent. Concentrations of optical brighteners in application baths can be monitored quantitatively by comparative phosphorescence measurements against calibrated standards. The optical brightener on a substrate can be directly determined by reflectance measurements. Alternatively, optical brighteners can be extracted with appropriate solvents and determined in solution; in the case of plastics, this involves dissolving the substrate.

Assessment of Whitening Effect

Whitening can be assessed either visually or instrumentally (by colorimetry). The quantities evaluated are the degree of whiteness and the tint. Special attention must be paid to the spectral distribution of the incident light in the UV and visible ranges, since this controls the phosphorescent contribution of the brightener to the whiteness. Visual assessment is performed by comparison with references in diffuse daylight. White scales consisting of stages with well-defined whiteness values (e.g., the Ciba-Geigy cotton or plastic white scale) can be used. For instrumental evaluation spectrophotometers are preferred; three-filter instruments can, however, also be employed. The calorimetric values obtained depend on the instrument and its instantaneous state (chiefly the sample illumination conditions) and must be controlled by suitable methods. The influence of the instrument can be eliminated by conversion to the standard illumination D 65, representing daylight with a correlated color temperature of 6504 K. The degree of whiteness and the tint values can then be calculated from these calorimetric data with appropriate formulas. A selection of currently used whiteness formulas can be found in G. Wyszecki, W. S. Stiles: Color Science, Concepts and Methods, Quantitative Data and Formulas, J. Wiley & Sons, New York—London—Sydney 1967.

The invention claimed is:

1. A method for optically brightening a substrate, said method comprising:
applying to the substrate an optical brightener selected from the group consisting of $BaMgAl_{10}O_{17}$:Eu, $Sr_3Ca_2(PO_4)_3Cl$:Eu, and $(SrBaCa)_5(PO_4)_3Cl$:Eu,
wherein
the content of europium is from 0.01 to 1 mole percent;
wherein the optical brightener has a particle size distribution of from 0.01 to 20 μm with at least one dimension below 100 nm,
wherein the optical brightener is characterized by:
(i) an absorption maximum in the range of from 350 to 375 nm;
(ii) a steep decrease of the absorption band near 400 nm;
(iii) a quantum yield of the phosphorescence of at least 0.95; and
(iv) a phosphorescence maximum in the range between 415 and 445 nm, and
wherein the substrate is a textile, paper or raw material used in paper making, and the optical brightener is added during papermaking to chemical or mechanical pulp.

2. The method of claim 1 wherein the optical brightener is applied as part of a brightener preparation comprising the optical brightener and at least one non-ionic or ionic tenside.

3. The method of claim 1 wherein the optical brightener is applied as part of a coating composition comprising (i) 5 to 70% by weight of a white pigment, and (ii) 0.005 to 1% by weight, based on the white pigment, of the optical brightener.

4. The method of claim 1, wherein the content of europium is from 0.1 to 0.5 mole percent.

* * * * *